Figure 1:
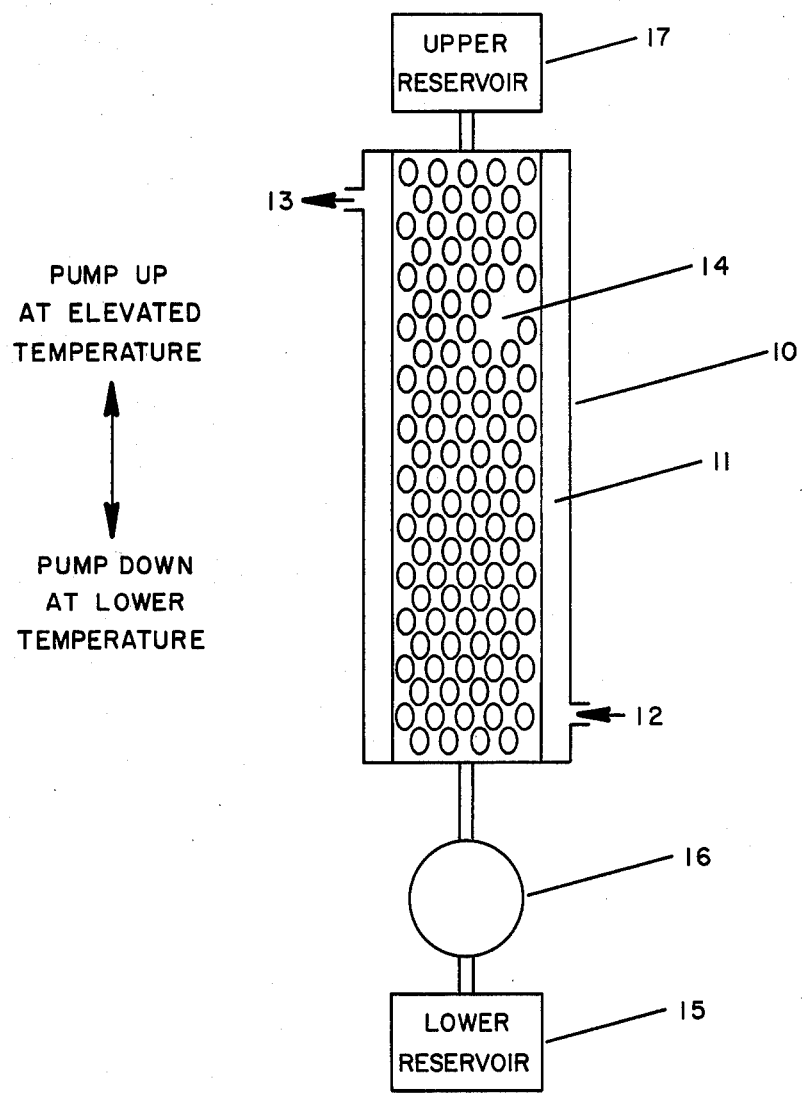

United States Patent [19]

Liu et al.

[11] 4,096,036
[45] Jun. 20, 1978

[54] METHOD FOR THE SEPARATION OF WATER SOLUBLE POLYOLS

[75] Inventors: Victor S. H. Liu; Norman E. Lloyd; Khaja Khaleeluddin, all of Clinton, Iowa

[73] Assignee: Standard Brands Incorporated, New York, N.Y.

[21] Appl. No.: 785,464

[22] Filed: Apr. 7, 1977

Related U.S. Application Data

[63] Continuation-in-part of Ser. No. 696,281, Jun. 15, 1976, abandoned.

[51] Int. Cl.² .............................................. C13D 3/14
[52] U.S. Cl. ............................ 195/31 F; 127/46 A; 210/40; 568/833; 568/868
[58] Field of Search .................. 127/46 A, 46 B, 55; 210/24, 40; 260/643 F, 643 G, 637 R; 536/1; 195/31 F

[56] References Cited

U.S. PATENT DOCUMENTS 3,817,787  6/1974  Von Hertzen et al. ........... 127/46 A
3,875,140  4/1975  Barker et al. ...................... 536/1

OTHER PUBLICATIONS

Chen et al., "Separation of Isomers via Thermal Parametric Pumping" *AICHE Journal*, vol. 21, No. 4, pp. 813–815 (1975).
Sweed, N. H., "Parametric Pumping" *Recent Developments in Separation Science*, N. Li, Editor, vol. 1, pp. 59–74, Chemical Rubber Co., Cleveland, Ohio (1972).
Wilhelm et al., "Parametric Pumping: A Dynamic Principle for Separating Fluid Mixtures", *I & EC Fundamentals*, vol. 5, No. 1, pp. 141–144 (1966).
Gupta, R. "Analysis of Parametric Pumping Separation and Reaction Systems", Ph. D. Thesis, Princeton University, Princeton, N. J., (1973).

*Primary Examiner*—Charles N. Hart
*Assistant Examiner*—Ivars Cintins

[57] ABSTRACT

A method is disclosed for the separation of water soluble polyols. A solution containing the polyols is passed cyclically at different temperatures through a column containing ion exchange materials to separate the polyols.

12 Claims, 3 Drawing Figures

A SIMPLIFIED ILLUSTRATION OF A THERMAL PARAMETRIC PUMPING APPARATUS

A SIMPLIFIED ILLUSTRATION OF A THERMAL PARAMETRIC PUMPING APPARATUS

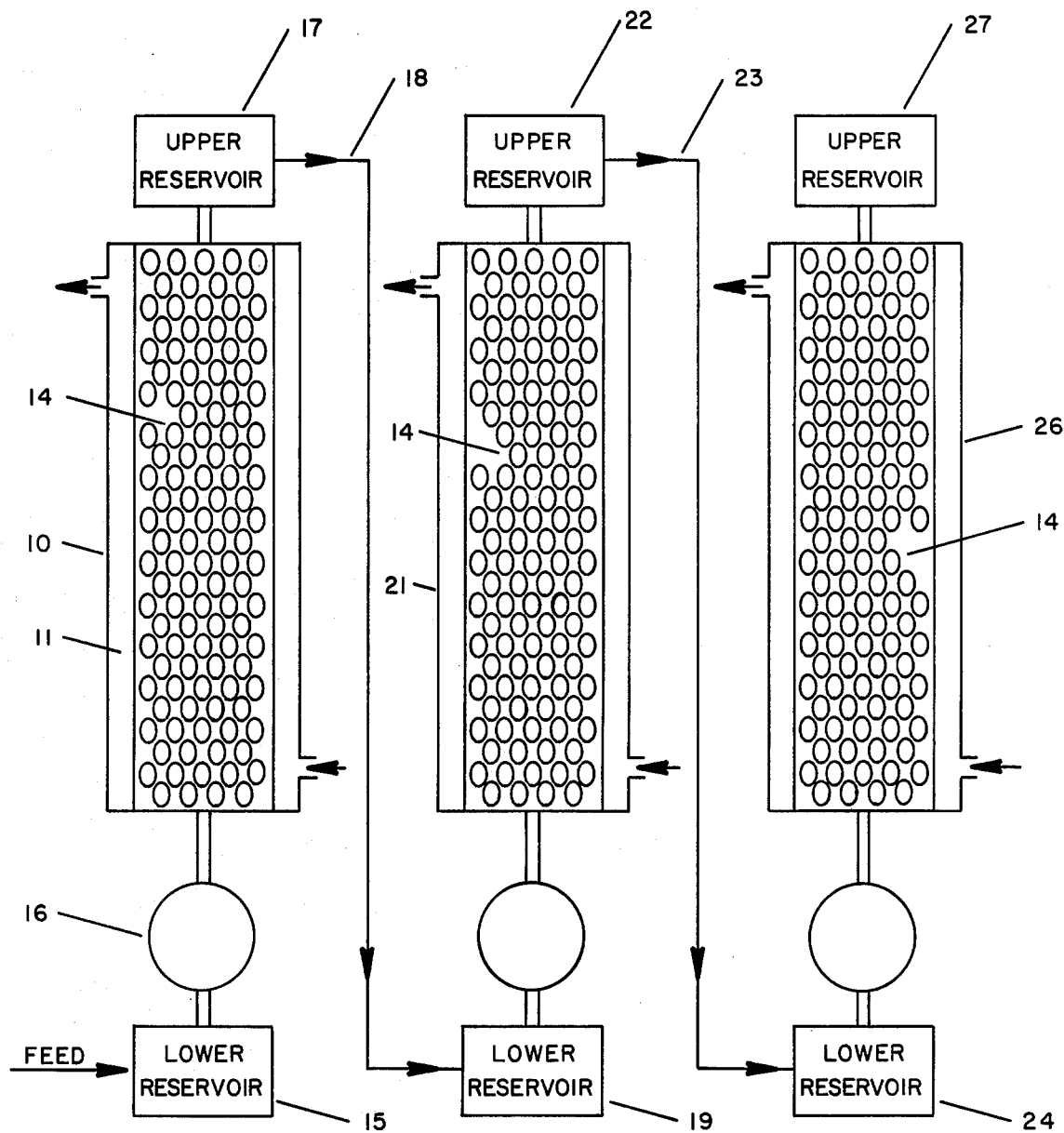
FIGURE II
A SIMPLIFIED ILLUSTRATION OF THREE THERMAL PARAMETRIC PUMPS OPERATED IN SERIES

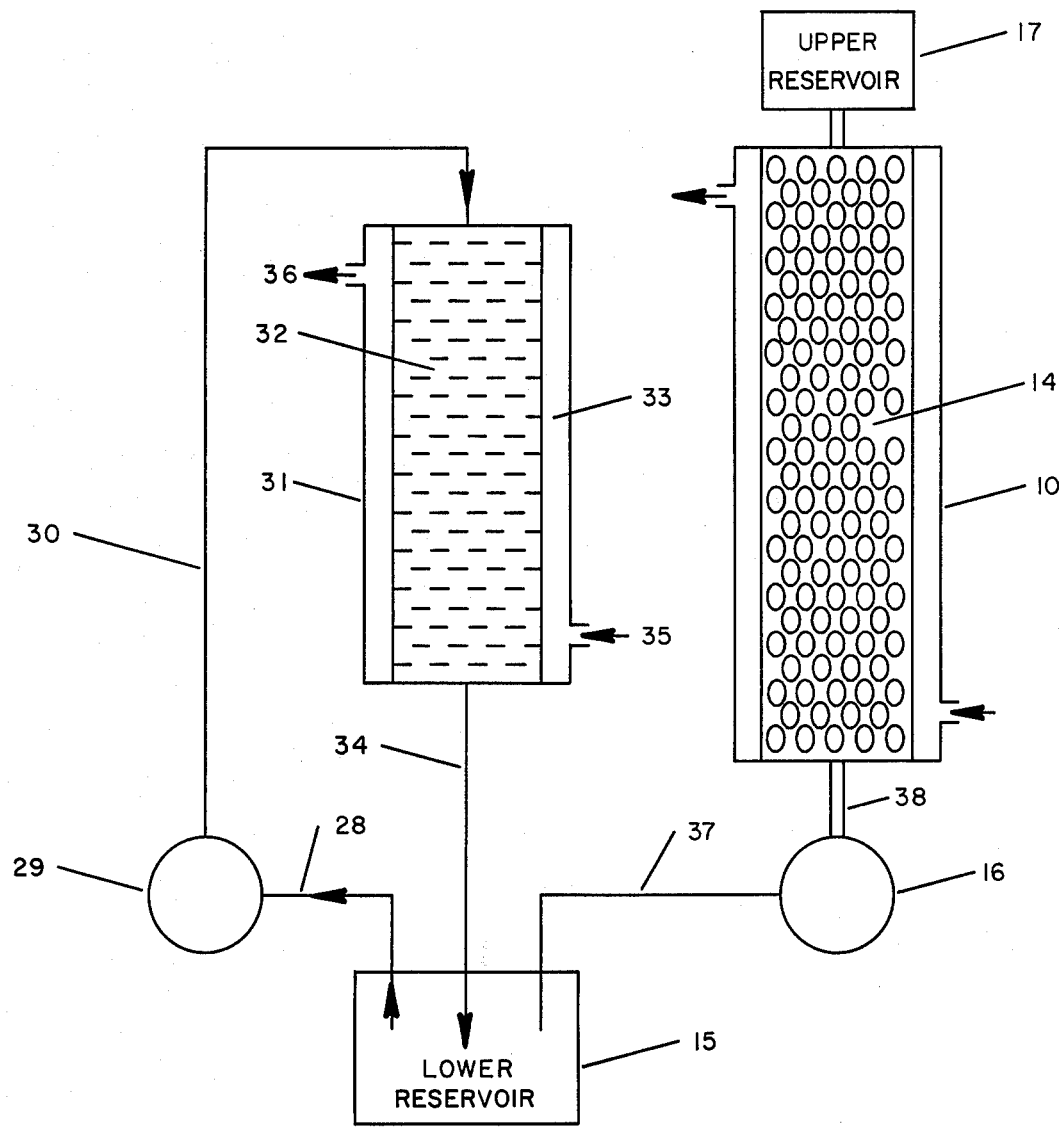
FIGURE III
A SIMPLIFIED ILLUSTRATION OF COMBINED
ISOMERIZATION REACTOR AND THERMAL PARAMETRIC
PUMPING APPARATUS

METHOD FOR THE SEPARATION OF WATER SOLUBLE POLYOLS

CROSS REFERENCE TO RELATED APPLICATIONS

This is a continuation-in-part of U.S. Patent Application Ser. No. 696,281, filed June 15, 1976, now abandoned, entitled "Method for the Separation of Water Soluble Polyols."

BACKGROUND OF THE INVENTION

The principle of parametric pumping was first applied to the separation of fluid mixtures by Wilhelm et al., *I & EC Fundamentals*, Vol. 5, No. 1, pp. 141–145 (1966). Broadly, this separation process utilized a packed bed of adsorbent particles in a column equipped with means for establishing a thermodynamic gradient therein by providing a heat source and a heat sink at opposite ends of the column. Pumping the fluid mixture cyclically through the column resulted in differential solute concentrations occurring at the column ends. In *Recent Developments in Separation Science*, Vol. 1, N. Li, Editor, Chemical Rubber Co., Cleveland, Ohio, pp. 59–74 (1972), N. H. Sweed described parametric pumping processes and discussed their use in the separation of both gas and fluid mixtures. H. T. Chen et al. in a paper presented at the 73rd National Meeting of the American Institute of Chemical Engineers, Minneapolis, August, 1972, described an attempt to achieve multicomponent separation of glucose and fructose from water by a parametric pump separation process using Fuller's earth as adsorbent. The process proved to be less than completely successful because of the very slow transfer rate and breakdown of the Fuller's earth after a short period of use. Chen et al., *AIChE J.*, Vol. 21, No. 4, pp. 813–815 (1975), reported obtaining about a 13 percent fructose enrichment in the separation of a glucose-fructose-water mixture by means of a parametric pumping process utilizing Bio-Rad AG 50W-X4 ($Ca^{2+}$) resin as the fractionation medium and column gradient temperatures of 5° and 55° C. R. Gupta discusses the theory of parametric pumping in "Analysis of Parametric Pumping Separation and Reactor Systems" (PhD Thesis, Princeton University, Princeton, N.J., 1973).

OBJECTS

It is a principal object of the present invention to provide a method for separating a polyol and an uncharged water soluble substance.

It is another object of the present invention to provide a method for separating water soluble polyols.

It is another object of the present invention to provide a method for separating glucose and fructose.

It is still another object of the present invention to provide a method for separating glucose and fructose wherein, during separation, a portion of the glucose is enzymatically converted to fructose.

These and other objects and advantages of the invention will be apparent from the following discussion and drawings.

SUMMARY OF THE INVENTION

This invention relates to a method for the separation of polyol A and an uncharged water soluble substance in aqueous solution by thermal parametric pumping by the utilization of ion exchange materials which are characterized as complexing with polyol A at a first temperature and at least partially dissociating from polyol A at a second temperature. The method comprises (1) passing the solution containing polyol A and the uncharged water soluble substance into a column of the ion exchange material at the first temperature to form the polyol A-resin complex; (2) withdrawing the solution from the column at the second temperature at which the polyol A-resin complex is at least partially dissociated; and (3) collecting at least two effluent portions, one being enriched in polyol A and the other being enriched in the uncharged water soluble substance. Steps 1 and 2 may be repeated until the desired degree of enrichment in polyol A and uncharged water soluble substance is achieved.

The term "enrichment" as used in this description refers to increasing the concentration of polyol A relative to the concentration of the uncharged water soluble substance and to increasing the concentration of the uncharged water soluble substance relative to the concentration of the polyol.

DRAWINGS

FIG. I is a simplified schematic illustration of a thermal parametric pumping apparatus.

FIG. II is a simplified schematic illustration of three thermal parametric pumps operated in series.

FIG. III is a simplified schematic illustration of a combination of a thermal parametric pump and an isomerization reactor.

DESCRIPTION OF THE INVENTION

In describing and claiming the instant invention, reference is made to the separation of a polyol A and an uncharged water soluble substance. However, for the purpose of this invention, it should be understood that the term "polyol" refers to an uncharged molecule having 3 or more hydroxyl groups. The molecule may also contain other uncharged functional groups, such as alehydo, keto, acetal and hemi-acetal groups. It should also be understood that polyol A and the water soluble substance do not necessarily represent two distinct species, but may relate to a group of materials. Therefore, the present method may also be carried out so that an uncharged polyol is separated from a group of uncharged water soluble substances or a group of polyols is separated from a group of uncharged water soluble substances. It is a preferred embodiment that the uncharged water soluble substance is also a polyol, hereinafter designated as polyol B.

The choice of the particular ion exchange material utilized in the present method will depend on a number of factors, but is principally based upon the ability of the material to complex polyol A at a first temperature and to at least partially dissociate the complex at a second temperature.

Exemplary of polyols which are contemplated as being capable of separation by this method are epi-inositol, alloinositol, 1,2,3,4,5/0-cyclohexane pentols, D-talose, D-ribose, L-iditol, allitol, 5-0-methyl-D-ribose, D-ribo-hex-3-ulose, D-gulcose, D-fructose, D-psicose, D-xylulose, and xylitol.

In general, the supposition is that polyols which can complex with ion exchange material are those also capable of complexing with cations in aqueous solution. S. J. Angyal outlines the structural requirements of polyols capable of complexing with cations (in *Carbohydrates in Solution*, Advance in Chemistry Series 117, American Chemical Society, Washington, D.C., 1973, pp. 106–120).

In a preferred embodiment of the present invention, fructose and glucose are separated from each other.

Fructose and glucose-containing solutions may be produced by processes well known in the art, such as the inversion of sucrose and the alkaline and enzymatic isomerization of glucose. Because of the low levels of impurities generally contained in enzymatically produced glucose-fructose solutions, such are preferred feed solutions in the present process. The presence of excessive quantities of impurities in the feed solution, such as saccharide degradation products, salts and the like, should be avoided since they may decrease the effectiveness of the ion exchange materials over extended periods of use. Preferably, the feed solutions are demineralized prior to being utilized in the present method.

Ion exchange materials which have been found to be effective to separate glucose and fructose are resins in the $Ba^{2+}$, $Ca^{2+}$, $Sr^{2+}$, $K^+$ or $La^{3+}$ forms and mixtures of resins in these forms. Sulfonate resins are particularly preferred. Surprisingly, other known polyol fractionation media, e.g., cation exchange resins in $Mg^{2+}$, $Fe^{3+}$, anion resin in the stannate, $HSO_3^-$, acetate, aluminate, borate and hydroxide forms and basic magnesium carbonate, did not perform satisfactorily in the separation of fructose and glucose according to the method of the present invention.

While we do not wish to be bound to any theory, it is believed that, in general, exchange materials effective in the present invention are those containing as the counterion a cation capable of complexing reversibly with polyol A in aqueous solution, examples of which are given above. Further, it is also believed that the cation must be held within the resin in a form capable of entering reversibly into a complex with polyol A. The ability of ion exchange materials to form reversible complexes with polyols can be determined by methods well known in the art as, for example, by the determination of an adsorption isotherm.

The temperatures at which the method is performed may vary and may be any temperatures at which polyol A will be complexed at one temperature by the ion exchange material and the complex at least partially dissociated at a different temperature. The temperatures utilized must not, of course, be so high as to cause breakdown of the polyols or so low as to increase the viscosity of the solution to such a degree that the flow rate thereof through the column is deleteriously affected. In the case of separating fructose and glucose, fructose will be complexed at lower temperatures and the complex will at least be partially dissociated at elevated temperatures. Lower temperatures in the range of from about 0° to about 25° C and elevated temperatures in the range of from about 40° to about 70° C have given satisfactory results.

The method of the present invention will be described by reference to the drawings. It should be understood, however, that the figures shown are merely exemplary of apparatus suitable for carrying out the present invention and that other equivalent means may be utilized without departing from the spirit of the invention.

FIG. I depicts a thermal parametric pumping apparatus wherein the present method may be performed. Column 10 contains ion exchange material 14 and is provided with water jacket 11. Column 10 is fitted at either end with reservoirs 15 and 17 and pump 16 is provided for forcing the solution containing polyols A and B from lower reservoir 15 through the resin in the column and into the upper reservoir 17. At the start, the solution in lower reservoir 15 and column 10 is at a lower temperature while upper reservoir 17 is empty. In the case where the solution contains fructose and glucose, glucose will not complex with the ion exchange material whereas the fructose will be preferentially complexed. To start a cycle, column 10 is heated to an elevated temperature by circulating hot water or steam through jacket 11 via inlet and outlet ports 12 and 13 whereupon the fructose-resin complexed is at least partially dissociated, thereby enriching the solution in the column in fructose. By means of pump 16, the solution in the column is transferred at a constant rate into reservoir 17 thereby obtaining an effluent portion enriched in fructose. When reservoir 17 is filled, cold water or another cooling medium is circulated through jacket 11 to cool the ion exchange material which then complexes an additional portion of fructose reducing its concentration in the solution in the column. The solution enriched in fructose is pumped from reservoir 17 into the column displacing the solution in the column to reservoir 15 which then contains a solution enriched in glucose relative to fructose. This completes one pumping cycle. The cycle may be repeated a number of times so that the solution in reservoirs 17 and 15 gradually becomes richer in fructose and glucose, respectively. The solution can be withdrawn from either reservoir when the desired degree of enrichment is achieved.

Figure II is a schematic drawing showing three parametric pump units in series. Columns 10, 21 and 26 contain ion exchange materials, 14 packed in water. The parametric pumps are operated similarly to the parametric pump depicted in FIG. I.

A solution containing polyol A and B is transferred from lower reservoir 15 via pump 16 through column 10 containing ion exchange material 14 to upper reservoir 17 and cycled back to lower reservoir 15, in the manner described above.

When the solution in upper reservoir 17 is sufficiently enriched in polyol A, conduit 18 is opened and the solution is transferred therethrough into lower reservoir 19 of the second parametric pump unit. The solution is cycled between lower reservoir 19 and upper reservoir 22 in the second parametric pump unit in the manner described previously. After the solution in reservoir 22 is sufficiently enriched in polyol A, it is transferred therefrom via conduit 23 to lower reservoir 24 where it is cycled between lower reservoir 24 and upper reservoir 27 in the third parametric pump unit. The solution in upper reservoir 27 may be withdrawn after the proportion of polyol A relative to polyol B reaches the desired level.

The utilization of a series of parametric pump units provides the benefit of a higher degree of enrichment of polyol A relative to polyol B, as compared to a single pumping unit.

In the case where glucose and fructose are being separated, a higher degree of enrichment may be achieved by combining an enzymatic isomerization reactor with one or more thermal parametric pumping units.

Figure III shows a schematic representation of a combined parametric pump enzymatic isomerization apparatus which may be utilized to carry out the present method.

A fructose-glucose solution in lower reservoir 15 is transferred via pump 16 through conduits 37 and 38 into column 10 and through ion exchange material 14 into upper reservoir 17 and back into reservoir 15 in accordance with the procedure previously described. The solution in reservoir 15 will gradually become depleted in fructose. The solution in reservoir 15 is continously circulated by pump 29 via conduits 28 and 30 to a reactor 31 containing immobilized glucose isomerase 32 where a portion of the glucose in the solution is converted to fructose. Heating medium may be circulated through jacket 33 of the reactor via inlet port 35 and outlet port 36 to maintain the reactor at an elevated temperature. The isomerized solution is transferred through conduit 34 into lower reservoir 15. By this mode of operation, the ratio of fructose to glucose can be maintained relatively constant but, of course, the dry substance will decrease as greater quantities of fructose are accumulated in reservoir 17.

The column containing the ion exchange material may be heated and cooled by two approaches. In the first, described above, heat energy is applied to and removed from the column externally by circulating heating and cooling media through the jackets of the column. In the second, the column is insulated and the solution is separately heated and cooled, for instance, in the upper and lower reservoirs. The first approach is a preferred embodiment of the present invention.

The parametric pump systems described above can be operated in a batch fashion or continuously. When operated in a batch fashion, the system will be closed so that no product is withdrawn or feed is introduced to the parametric pump during its operation. When it is operated continuously, feed solution is introduced and product is drawn from the system at a predetermined rate.

In order to more clearly describe the nature of the present invention, specific examples will be hereinafter described. It should be understood, however, that this is done solely by way of example and is intended neither to delineate the scope of the invention nor limit the ambit of the appended claims.

The fractionation media used in the following examples was a sulfonate resin, Dowex 50 (Dow Chemical Co.), in various metal forms. The resin was conditioned for use by the following procedure:

(1) Soak resin in water for ½ hour before transferring to a glass funnel filter;

(2) Wash the resin with 2 bed-volumes of 2 N HCl in 30 min.;

(3) Wash out acid with five bed-volumes of deionized water in 30 min.;

(4) Wash the resin with two bed-volumes of 1.5 N NaOH in 30 min.;

(5) Wash out the caustic with 5 bed-volumes of deionized water in 30 min.;

(6) Repeat the acid-rinse-caustic-rinse cycle outlined in steps 2–5.

(7) Convert the resin to $H^+$ form by washing with one bed-volume of 2 N HCl in 30 min. and then rinsing with 5 bed-volumes of deionized water in 30 min.;

(8) Convert this $H^+$ form resin to the desired metal form, such as $Ca^{2+}$ form, by rinsing with one bed volume of 10% salt solution in 30 min. and then rinsing with two bed-volumes of deionized water before use.

The desired metal form resin was vacuum filtered to remove surface moisture to about 45% dry substance.

EXAMPLE I

This Example illustrates an embodiment of the present invention wherein heat energy is applied to and removed by external means from the column of a parametric pumping system and the process is performed in a batch fashion.

Approximately 140g resin in a metal form was slurried in about 350 ml of water and the slurry transferred to a 350 ml jacketed glass column having an inside diameter of 2.5 cm, fitted as a thermal parametric pumping apparatus illustrated in Figure I. 200 ml of glucose-fructose solution containing 30g of fructose and 30g of glucose was transferred into the lower reservoir, the upper reservoir remaining empty prior to the start of pumping.

190 ml of the solution was pumped from the lower reservoir (thereby displacing the water in the column to the upper reservoir) at an elevated temperature and then pumped downward through the column to the lower reservoir at reduced temperatures. This sequence in steps constitutes one cycle, each cycle comprising two half cycles, one being pumping solution upwardly at elevated temperatures and the other being pumping solution downwardly at reduced temperatures.

The conditions under which the process was performed are set forth in Table I below:

TABLE I

| Conditions Under Which Parametric Pumping System Was Operated | | |
|---|---|---|
| Metal form of resin | $Sr^{2+}$ | $Ca^{2+}$ |
| Volume of resin in column (ml) | 330 | 330 |
| Void volume of column (ml) | 230 | 230 |
| Volume of solution in lower reservoir at start (ml) | 200 | 200 |
| Period for each temperature change (min) | 8 | 8 |
| Period for each half cycle (min) | 45 | 45 |
| Elevated temperature (° C) | 60 | 60 |
| Reduced temperature (° C) | 8 | 25 |

The concentration of the carbohydrates in the lower and upper reservoirs after a number of pumping cycles are set forth in Table II below:

TABLE II

| | Concentration of Carbohydrates in Reservoirs | | | |
|---|---|---|---|---|
| | Upper Reservoir Solution After 11½ Cycles | | Lower Reservoir Solution After 12 Cycles | |
| Metal form of resins | $Ca^{2+}$ | $Sr^{2+}$ | $Ca^{2+}$ | $Sr^{2+}$ |
| % glucose d.b. | 25.40 | 28.84 | 69.90 | 78.89 |
| % fructose, d.b. | 74.60 | 71.16 | 30.10 | 21.11 |
| Glucose and fructose (g/100 ml) | 8.33 | 13.12 | 16.89 | 13.81 |
| Glucose (g/100 ml) | 2.12 | 3.78 | 11.81 | 10.89 |
| Fructose (g/100 ml) | 6.21 | 9.34 | 5.08 | 2.92 |

EXAMPLE II

This Example was performed similarly to the previous example except that about 40g d.b. of the resins in the various metal forms was first slurried with about 150 ml of the glucose-fructose solution at a temperature of 25° C for 30 minutes to equilibrate the resin and the solution and then the resins were transferred into 100 ml columns having an inside diameter of 1.5 cm.

In each case, 65 ml of the solution in which the resin had been slurried was transferred into the lower reservoir, the upper reservoir remaining empty prior to the start of pumping. The concentration of the glucose and fructose in the void spaces in the columns and in the lower reservoirs were therefore initially uniform and in equilibrium with the resins at 25° C. 55 ml of the solution was pumped from the lower reservoirs through the columns at an elevated temperature and then pumped downwardly through the columns to the lower reservoirs at a reduced temperature.

The conditions under which the process was performed are set forth in Table III below.

TABLE III

Conditions Under Which Parametric Pumping System Was Operated

| Metal form of resin | $Ca^{2+}$ | $Ba^{2+}$ | $K^+$ |
|---|---|---|---|
| Concentration of saccharides in lower reservoir at start | | | |
| % glucose d.b. | 52.61 | 52.97 | 51.13 |
| % fructose d.b. | 47.39 | 47.03 | 48.87 |
| Glucose & Fructose (g/100 ml) | 24.18 | 24.71 | 24.50 |
| glucose (g/100 ml) | 12.72 | 13.09 | 12.53 |
| fructose (g/100 ml) | 11.46 | 11.62 | 11.97 |
| Volume of resin in column (ml) | 100 | 100 | 100 |
| Void volume of column (ml) | 71 | 71 | 71 |
| Volume of solution in lower reservoir at start (ml) | 65 | 65 | 65 |
| Period for each temperature change (min.) | 5 | 5 | 5 |
| Period for each half cycle (min.) | 20 | 20 | 20 |
| Elevated temperature (° C) | 60 | 60 | 60 |
| Reduced temperature (° C) | 25 | 25 | 25 |

The concentrations of glucose and fructose in the lower and upper reservoirs after a number of pumping cycles are set forth in Table IV, below:

TABLE IV

Concentration of Glucose and Fructose in Reservoirs

| | Upper Reservoir Solution* | | | Lower Reservoir Solution** | | |
|---|---|---|---|---|---|---|
| Metal form of resin | $Ca^{2+}$ | $Ba^{2+}$ | $K^+$ | $Ca^{2+}$ | $Ba^{2+}$ | $K^+$ |
| % glucose d.b. | 32.14 | 44.42 | 41.57 | 87.15 | 67.99 | 66.93 |
| % fructose d.b. | 67.86 | 55.58 | 58.43 | 12.85 | 32.01 | 33.07 |
| Glucose & fructose (g/100 ml) | 33.25 | 17.76 | 26.54 | 17.10 | 17.77 | 12.20 |
| Glucose (g/100 ml) | 10.69 | 13.82 | 11.03 | 14.90 | 12.08 | 8.16 |
| Fructose (g/100 ml) | 22.56 | 17.29 | 15.51 | 2.20 | 5.68 | 4.04 |

*17½ cycles for resin in $Ca^{2+}$ form and 27½ cycles for resin in $Ba^{2+}$ and $K^+$ forms.
**18 cycles for resin in $Ca^{2+}$ form and 28 cycles for resin in $Ba^{2+}$ and $K^+$ forms.

EXAMPLE III

This Example illustrates the utilization of a parametric pump and a reactor containing immobilized glucose isomerase for performing the present invention.

The apparatus utilized in this Example is depicted in Figure III and operated as previously described.

Approximately 60g d.b. of resin in the $Ca^{2+}$ metal form was slurried with about 350 ml of a glucose-fructose solution at a temperature of 25° C for 30 minutes to equilibrate the resin. About 40g of the resin was then transferred into a 100 ml column having an inside diameter of 1.5 cm, and 170 ml of the solution from the slurry was fed into the lower reservoir, the upper reservoir remaining empty prior to the start of pumping.

20g of immobilized glucose isomerase was packed into a reactor and washed with 100 ml of the solution utilized in the parametric pumping system. The sugar solution at a pH of 7.8 was circulated from the lower reservoir through the reactor at a flow rate of 3.94 ml/min. and a temperature of 65° C. The total glucose isomerase activity of the immobilized glucose isomerase in the reactor was 4955 IGIU.

70 ml of the solution was pumped from the lower reservoir in the column at an elevated temperature and then pumped downwardly through the resin column to the lower reservoir at a reduced temperature.

As depicted in Figure III, two separate pumps were utilized, one for transferring the sugar solution from the lower reservoir through the enzyme reactor and the other for pumping the solution through the resin bed.

The conditions under which the parametric pumping portion of the process was carried out are set forth in Table V below:

TABLE V

Conditions Under Which Parametric Pumping System Was Operated

| Metal form of resin | $Ca^{2+}$ |
|---|---|
| Volume of resin in column (ml) | 100 |
| Void volume of column (ml) | 71 |
| Volume of solution in lower reservoir at start (ml) | 170 |
| Period for each temperature change (min.) | 4 |
| Period for each half cycle (min.) | 13 |
| Elevated temperature (° C) | 60 |
| Reduced temperature (° C) | 25 |
| Concentration of saccharides in lower reservoir at start | |
| % glucose d.b. | 49.0 |
| % fructose d.b. | 45.0 |
| % other saccharides d.b. | 6.0 |

For comparison purposes, another parametric pumping system was operated as described above except that the system did not include an enzyme reactor.

In Table VI below, the concentrations of the glucose and fructose in the lower and upper reservoirs are set forth:

TABLE VI

Concentration of Glucose and Fructose in Reservoirs

| | Upper Reservoir After 33½ Pumping Cycles | | Lower Reservoir After 34 Pumping Cycles | |
|---|---|---|---|---|
| | no enzyme reactor | with enzyme reactor | no enzyme reactor | with enzyme reactor |
| % fructose, dry basis | 61 | 71 | 32 | 47 |
| % glucose, dry basis | 34 | 24 | 61 | 45 |
| % other saccharides, dry basis | 5 | 5 | 7 | 8 |

From the above, it is seen that the utilization of an enzyme reactor in combination with a parametric pumping system results in increased enrichment of the upper reservoir solution in fructose compared to the utilization of a parametric pumping system alone.

EXAMPLE IV

This Example illustrates the utilization of three parametric pumping units positioned in series to separate fructose and glucose.

40g d.b. of resin in the $Ca^{2+}$ form was slurried in 150 ml of water and packed into each of the three 100 ml columns having an inside diameter of 1.5 cm. The parametric pumping system utilized is depicted in FIG. II and described previously. 70 ml of a fructose-glucose solution was transferred into the lower reservoir of the first parametric pumping unit, the remaining reservoirs being empty. 60 ml of the solution was pumped upward from the lower reservoir at an elevated temperature into the column and then pumped downward from the column to the lower reservoir at reduced temperature. This procedure was repeated to give a total of seven and a half cycles and then the solution in the upper reservoir was transferred to the lower reservoir of the second parametric pump unit where seven and a half pumping cycles were repeated. Then, the solution in the upper reservoir of the second parametric pumping unit was transferred to the lower reservoir of the third parametric pumping unit where seven and a half pumping cycles were again repeated.

The conditions under which the process was performed are set forth in Table VII, below:

TABLE VII

| Conditions Under Which Parametric Pumping Systems Were Operated | |
|---|---|
| Metal form of resin | $Ca^{2+}$ |
| Volume of resin in each column (ml) | 100 |
| Void volume of each column (ml) | 71 |
| Volume of solution in lower reservoir of first pump unit (ml) | 70 |
| Period for each temperature change (min.) | 4 |
| Period for each half cycle (min.) | 18 |
| Elevated temperature (° C) | 60 |
| Reduced temperature (° C) | 25 |
| Concentration of saccharides in lower reservoir of first unit at start | |
| glucose (g/100 ml) | 15 |
| fructose (g/100 ml) | 15 |

The concentration of fructose and glucose in the upper reservoirs of each parametric pumping unit after 7½ cycles are set forth below in Table VIII:

TABLE VIII

| Solution in Upper Reservoirs After Seven and a Half Pumping Cycles | | | |
|---|---|---|---|
| | 1st Unit | 2nd Unit | 3rd Unit |
| % fructose d.b. | 72.6 | 79.7 | 85.5 |
| % glucose d.b. | 27.4 | 20.3 | 14.5 |

EXAMPLE V

This Example illustrates the separation of xylitol and xylose in accordance with the present method.

The general conditions which this Example was performed under were in accordance with previous Examples I and II.

Approximately 56 g of sulfonate resin (Dowex 50) in a metal form was slurried in about 100 ml of water and transferred into a column having an inside diameter of 1.5 cm, and fitted as a thermal parametric pumping apparatus as illustrated in Figure 1. Volume of the packed bed was 100 ml. 70 ml of xylitol-xylose solution containing 10.5 g of xylitol and 10.5 g of xylose were transferred into the lower reservoir, the upper reservoir remaining empty prior to the start of pumping.

65 ml of the solution was pumped from the lower reservoir (thereby displacing the water in the column to the upper reservoir) at an elevated temperature and then pumped downward through the column to the lower reservoir at reduced temperature.

The conditions under which the process was performed are set forth below in Table IX:

TABLE IX

| Conditions Under Which Parametric Pumping System Was Operated | |
|---|---|
| Metal Form of Resin | $Ca^{2+}$ |
| Volume of Resin in Column (ml) | 100 |
| Void Volume of Column (ml) | 71 |
| Volume of Solution in Lower Reservoir (ml) | 70 |
| Period for Each Temperature Change (min.) | 5 |
| Period for Each Half Cycle (min.) | 20 |
| Elevated Temperature (° C) | 60 |
| Reduced Temperature (° C) | 10 |

The concentrations of the polyols in the lower and upper reservoirs after a number of pumping cycles are set forth in Table X below:

TABLE X

| Concentrations of Polyols in Reservoirs | | |
|---|---|---|
| | Upper Reservoir Solution After 7½ Cycles | Lower Reservoir Solution After 7 Cycles |
| % xylitol d.b. | 72.67 | 22.16 |
| % xylose d.b. | 25.17 | 77.54 |
| % sorbitol* d.b. | 2.16 | 0.3 |
| Xylitol and xylose (g/100 ml) | 10.49 | 14.66 |
| Xylitol (g/100 ml) | 7.79 | 3.26 |
| Xylose (g/100 ml) | 2.70 | 11.40 |

*Sorbitol was an impurity contained in the xylitol utilized to make up the original solution.

The terms and expressions which have been employed are used as terms of description and not of limitation, and it is not intended in the use of such terms and expressions to exclude any equivalents of the features shown and described or portions thereof, since it is recognized that various modifications are possible within the scope of the invention claimed.

What is claimed is:

1. A method for the separation of polyol A and an uncharged water soluble substance in aqueous solution by thermal parametric pumping by the utilization of ion exchange materials which are characterized as complexing with polyol A at a first temperature and at least partially dissociating from polyol A at a second temperature comprising:
   (a) passing the solution containing polyol A and an uncharged water soluble substance into a column of said ion exchange material at the first temperature to form the polyol A ion exchange material complex,
   (b) withdrawing the solution from the column at the second temperature at which the polyol A ion exchange material complex is at least partially dissociated, and
   (c) collecting at least two effluent portions, one being enriched in polyol A and the other being enriched in the uncharged water soluble substance.

2. A method of separation as defined in claim 1, wherein the uncharged water soluble substance is polyol B.

3. A method of separation defined in claim 2, wherein polyol A is fructose and polyol B is glucose.

4. A method of separation as defined in claim 3, wherein the ion exchange material is an ion exchange resin in the metal form selected from the group consisting of $Ba^{2+}$, $Ca^{2+}$, $Sr^{2+}$, $K^+$, $La^{3+}$ and mixtures thereof.

5. A method of separation as defined in claim 4, wherein the ion exchange material is an ion exchange resin in the $Ca^{2+}$ metal form.

6. A method for the separation of polyol A and polyol B as defined in claim 5, wherein heat energy is applied and removed from the column of ion exchange material by external means.

7. A method of separation as defined in claim 4, wherein fructose is complexed at a temperature in the range of from about 0° to about 25° C and the complex is dissociated at a temperature in the range of from about 40° to about 70° C.

8. A method of separation as defined in claim 4, wherein the glucose enriched effluent portion is passed through an enzyme reactor containing immobilized glucose isomerase to convert a portion of the glucose to fructose and the resulting solution cycled through the column of ion exchange material in accordance with steps (a) and (b) above.

9. A method for the separation of polyol A and polyol B as defined in claim 2, wherein the separation is performed in two or more parametric pump units connected in series.

10. A method for the separation of polyol A and polyol B as defined in claim 9, wherein feed solution is introduced and product is withdrawn from the system at a predetermined rate.

11. A method for separation as defined in claim 2, wherein polyol A is xylitol and polyol B is xylose.

12. A method for separation as defined in claim 1, wherein polyol A is selected from the group consisting of epi-inositol, allo-inositol, 1,2,3,4,5/0-cyclohexane pentols, D-talose, D-ribose, L-iditol, allitol, 5-0-methyl-D-ribose, D ribo-hex-3-ulose, D-glucose, D-fructose, D-psicose, D-xylulose, and xylitol.

* * * * *